United States Patent [19]

Lessway

[11] Patent Number: 5,058,468

[45] Date of Patent: Oct. 22, 1991

[54] REMOTE GAGE STEADY REST HEAD

[75] Inventor: Richard J. Lessway, Farmington Hills, Mich.

[73] Assignee: Arobotech Systems, Inc., Warren, Mich.

[21] Appl. No.: 585,242

[22] Filed: Sep. 19, 1990

[51] Int. Cl.$^5$ .................................................. B23B 25/00
[52] U.S. Cl. ........................................ 82/157; 82/164; 294/119.1; 279/1 L; 279/121; 51/238 S
[58] Field of Search ............................... 82/157–164; 294/119.1, 88; 33/710; 51/238 R, 238 S; 279/1 L, 121, 111

[56] References Cited

U.S. PATENT DOCUMENTS

| | | | |
|---|---|---|---|
| 4,399,639 | 8/1983 | Lessway | 51/238 S |
| 4,416,174 | 11/1983 | Owsen | 82/162 |
| 4,463,635 | 8/1984 | Hafla et al. | 82/162 |
| 4,519,279 | 5/1985 | Ruggeri | 82/164 X |
| 4,647,097 | 3/1987 | Lessway | 294/119.1 X |
| 4,647,100 | 3/1987 | Lessway | 294/119.1 |
| 4,650,237 | 3/1987 | Lessway | 294/119.1 |
| 4,754,673 | 7/1988 | Hiestand | 82/164 |

Primary Examiner—Gary F. Paumen
Assistant Examiner—Julie R. Daulton
Attorney, Agent, or Firm—Robert G. Mentag

[57] ABSTRACT

An automatic true centering steady rest apparatus for a rotating cylindrical workpiece during a machining or grinding operation on the workpiece. The apparatus has an integrally mounted gaging device, for continuously gaging the diameter of a workpiece during a machining or grinding operation. A pair of gripper arms are slidably mounted on an operator body in a housing. Each gripper arm and the operator body carries a workpiece contact member engageable with the perimeter of the workpiece. The gripper arms are urged to grip a workpiece by the action of a pair of rollers and two sets of fixed guide pins which are operatively engageable with camming contours contained on opposing inner surfaces of the apparatus housing. The improved efficiency of the apparatus, as a result of the roller and guide pin action allows for placing the gaging device remotely from the workpiece, without any loss in the precision of its measurement.

8 Claims, 3 Drawing Sheets

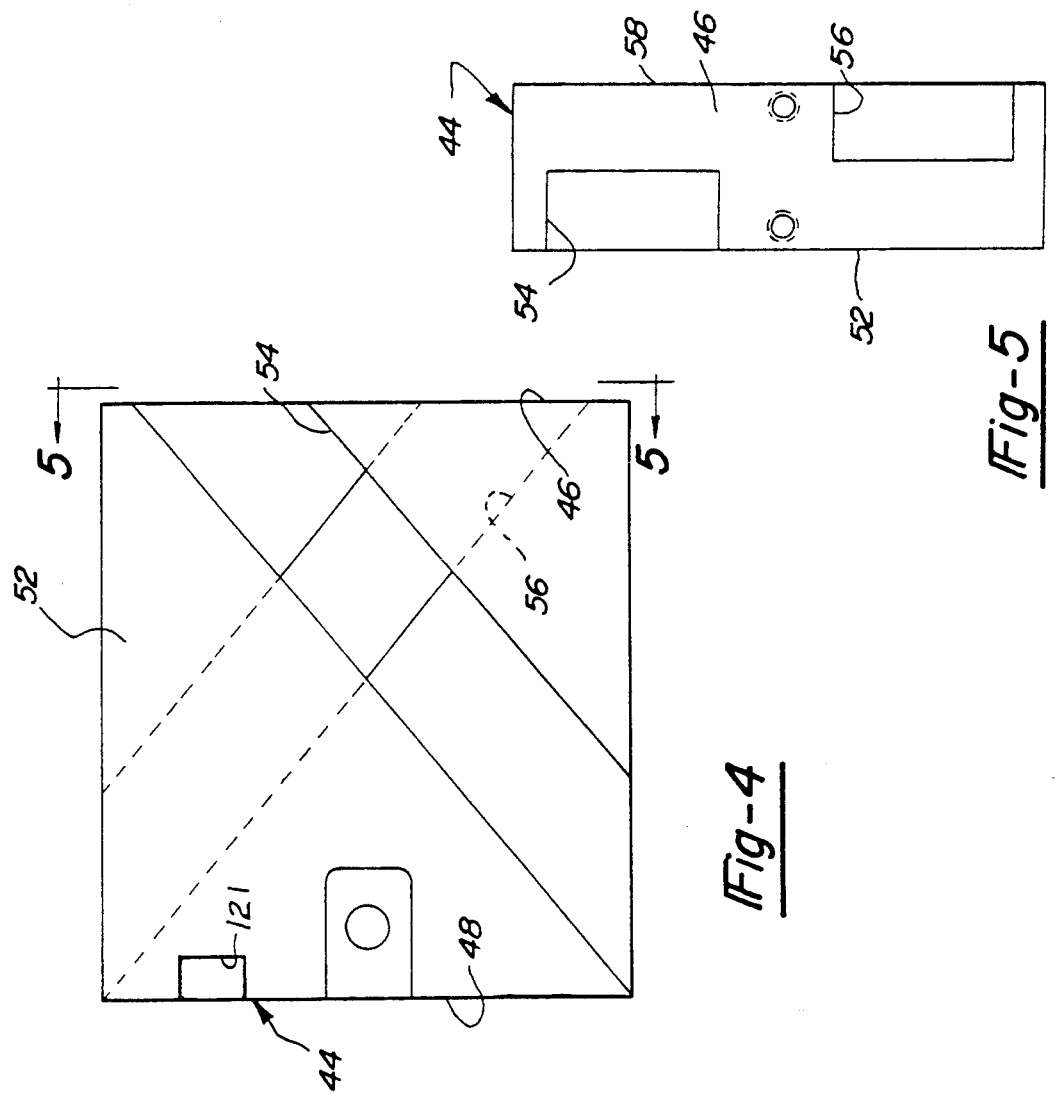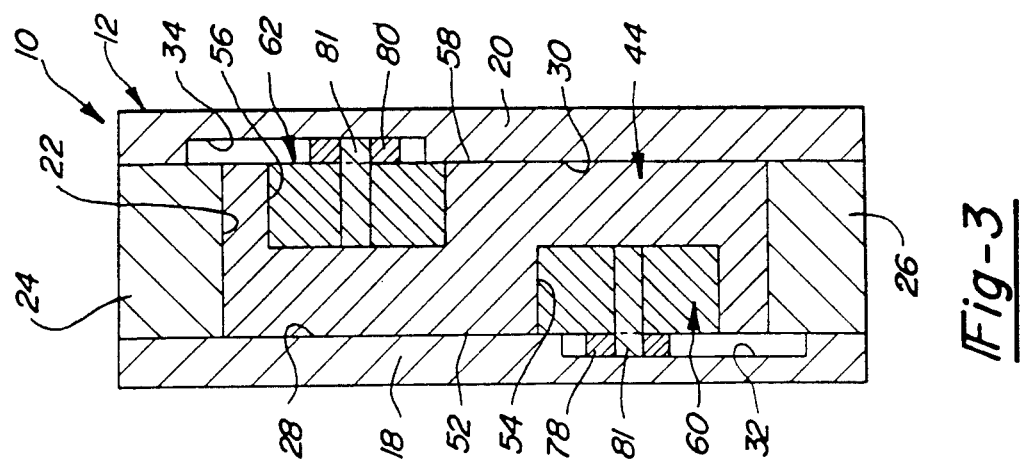

REMOTE GAGE STEADY REST HEAD

BACKGROUND OF THE INVENTION

1. Field of the Invention

The present invention generally relates to steady rests employed to rotatably support cylindrical workpieces. More specifically, this invention relates to a three-point, true centering steady rest having an integral displacement measuring device for remotely measuring the amount of material removed from a workpiece, and having a more efficient gripping action for assuring precision of the remote displacement measuring device.

2. Description of the Prior Art

Steady rests are commonly used in the machine tool industry to support cylindrical workpieces during machining or grinding operations when the operation is performed while the workpiece is rotating. There are primarily two benefits to using a steady rest under such conditions. The first is the prevention of deflection at the point of the operation when working with an elongated workpiece. The second is the stabilizing effect of the steady rest on the workpiece to improve the precision of the operation. Because of the precision operations for which a steady rest is typically employed, some means of gaging the diameter of the workpiece, or alternatively, gaging the amount of material removed from the workpiece, is necessary in conjunction with the steady rest.

Steady rests generally have at least two points of contact for supporting the workpiece and some form of adjustment for gripping the workpiece uniformly around its perimeter. A steady rest, such as that disclosed in U.S. Pat. No. 4,399,639 to Lessway, which is designed to grip the workpiece through its true center is therefore particularly desirable for its ability to accurately support the workpiece and for its ease of operation.

An improvement to the above true center action is disclosed in U.S. Pat. No. 4,650,237 to Lessway in which automatic three-point centering and gripping is accomplished. There, the gripping is provided by a center workpiece contact member and a pair of gripper arms, each having a side workpiece contact member. The gripper arms are operatively attached to an operator body slidably mounted within a housing. The center workpiece contact member is disposed on one end of the operator body adjacent and between the gripper arms. The gripping action of the gripper arms is accomplished by pentagonal cams which reside within a pair of cam tracks in the housing wall.

As the operator body is moved within the housing toward the workpiece, the gripper arms first move parallel with the operator body and to each other. Once alongside the workpiece, the gripper arms, in cooperation with the cam tracks, move laterally toward the workpiece in a manner which operatively provides centering and gripping engagement with the workpiece.

However, as noted above, steady rests typically require some means of gaging the workpiece to determine when the operation should be discontinued upon achieving a desired size on the workpiece. For purposes of precision, it is preferable to place the gage on the workpiece alongside the steady rest to gain the benefit of the workpiece's stability adjacent the steady rest. This requirement is a disadvantage with the prior art steady rests because of the limited space allowed in the vicinity of the steady rests, particularly when working with smaller workpieces, such as a camshaft or crankshaft. In addition, the machining and grinding debris and the increased possibilities of damage to the gage when adjacent the workpiece make this arrangement undesirable.

As can be appreciated from the above, it would be desirable to incorporate within the steady rest a means for gaging the workpiece during its machining operation. It would be additionally desirable if the gaging means could operate with the same precision as if it were directly gaging the workpiece without actually being in intimate contact with the workpiece.

Internal components of contemporary steady rest designs do not follow the workpiece precisely enough to sufficiently provide a surface from which to gage the workpiece. By example, U.S. Pat. No. 4,650,237 to Lessway, cited above, is limited by the pentagonal cam followers which inherently have higher frictional drag than is acceptable for the precision required.

Accordingly, what is needed is a steady rest having an integral means for gaging the workpiece during a precision operation in which the measuring device is positioned remotely from the workpiece without any significant loss in precision.

SUMMARY OF THE INVENTION

According to the present invention there is provided a steady rest for centering and gripping a workpiece. The steady rest has a housing with a longitudinal axis and a transverse axis. The housing has at one end of its longitudinal axis a working end adjacent the workpiece. The housing also has a camming surface which is parallel to the plane of the longitudinal and transverse axis.

Disposed within the housing is an operator body. The operator body is slidable longitudinally along the camming surface of the housing. At one end of the operator body adjacent the housing's working end is a center workpiece contact member, forming one of the three workpiece contact members of the present invention. A gaging device is positioned and attached such that it is capable of measuring the longitudinal displacement of the operator body relative to the housing.

A pair of gripper arms are operatively associated with the operator body within the housing. Each of the gripper arms have a sliding end and a gripping end, the gripping end extending longitudinally from the working end of the housing. In addition, a side workpiece contact member is disposed at each gripping end for providing the second and third workpiece contact members of the three-point workpiece contact arrangement of the present invention. Each gripper arm also has a sliding portion adjacent its sliding end which is slidable in the operator body. Each gripper arm also has a roller, which is rotatably attached to each gripper arm on its sliding portion, and a pair of adjacent guide pins.

A pair of cams are formed in the camming surface of the housing, in each of which are operatively disposed one of the rollers, and its adjacent pair of guide pins, mounted on the gripper arms. Each cam has a longitudinal portion and a substantially transverse portion. The guide pins slidably engage the longitudinal portion during an extension or advancement stroke of the operator body, and they also engage the longitudinal portion during a retraction stroke of the operator body. The rollers engage the cam transverse portions and provide low friction camming action between the pair of gripper arms and their corresponding pair of cams during a follow-down grinding operation and the like.

The operator body is stroked, within the housing, longitudinally along the camming surface, preferably by an electrical or fluid actuated power source. One cycle of the operator body consists of an extension stroke and a retraction stroke. The guide pins slidably engage, while the rollers pass through, the longitudinal portion of their cam during the extension stroke, to longitudinally extend the center workpiece contact member. Once the longitudinal portion has been traversed, each roller engages the narrower transverse portion of its cam for the final portion of the extension stroke. The transverse portion provides for further longitudinal extension of the center workpiece contact member while providing for convergence of the two side workpiece contact members arms. The simultaneous movements of the center and side workpiece contact members toward a workpiece provide a three-point true centering engagement with a workpiece. On the retraction stroke, each set of guide pins and rollers follow their respective cam portions, in a reverse manner, to return the gripper arms and operator body to their original positions.

A desirable result of the roller-guide pin-cam arrangement is the ability of the operator body, along with the gripper arms, to closely follow the perimeter of a circular workpiece. The rollers provide smooth, low frictional operation between the gripper arms and the transverse portions of the cams, which accordingly allows the operator body to closely follow the displacement of the gripper arms as a result of change in a workpiece's diameter during a grinding or machining operation on the workpiece. The operation and efficiency of the steady rest is consequently improved by the reduction of its internal friction.

In addition, a significant advantage of the present invention is that the gaging device can accurately read directly off the operator body. The longitudinal displacement of the operator body corresponds exactly to the longitudinal displacement of the center workpiece contact member, which in turn directly contacts the workpiece on its perimeter. As a result, the gaging means can be located adjacent the operator body and remotely from the workpiece, and yet still retain the precision required for most machining and grinding operations. The remote location of the gaging device also reduces contamination and damage to the gaging device, while also allowing for a larger, stronger steady rest for better support of a workpiece.

Another benefit is that the stroking of the operator body can be computer controlled to coact with the gaging device when an electronic measuring device is used. In cooperation with the automatic true centering capability of the present invention, automatic manufacturing processes are then achievable with suitable precision.

Accordingly, it is an object of the present invention to provide a steady rest with an integral gaging device for measuring the progress of a machining or grinding operation on a cylindrical workpiece.

It is a further object of this invention that such a steady rest have its integral gaging device located remotely from the workpiece for purposes of freeing the workpiece in the vicinity of the steady rest from excessive congestion.

It is still a further object of this invention that such a steady rest be designed to minimize internal friction between the gripper arms and the cams which provide the gripping action to the gripper arms.

Other objects and advantages of this invention will be more apparent after a reading of the following detailed description taken in conjunction with the drawings provided.

BRIEF DESCRIPTION OF THE DRAWINGS

FIG. 3 is a cross-sectional view of FIG. 1, taken along line 3—3 thereof, and looking in the direction of the arrows.

FIG. 4 is a front elevation view of the operator body in accordance with a preferred embodiment of this invention.

FIG. 5 is a right end view of the operator body of FIG. 4, taken along the line 5—5 thereof, and looking in the direction of the arrows.

DESCRIPTION OF THE PREFERRED EMBODIMENT

Figure 1:
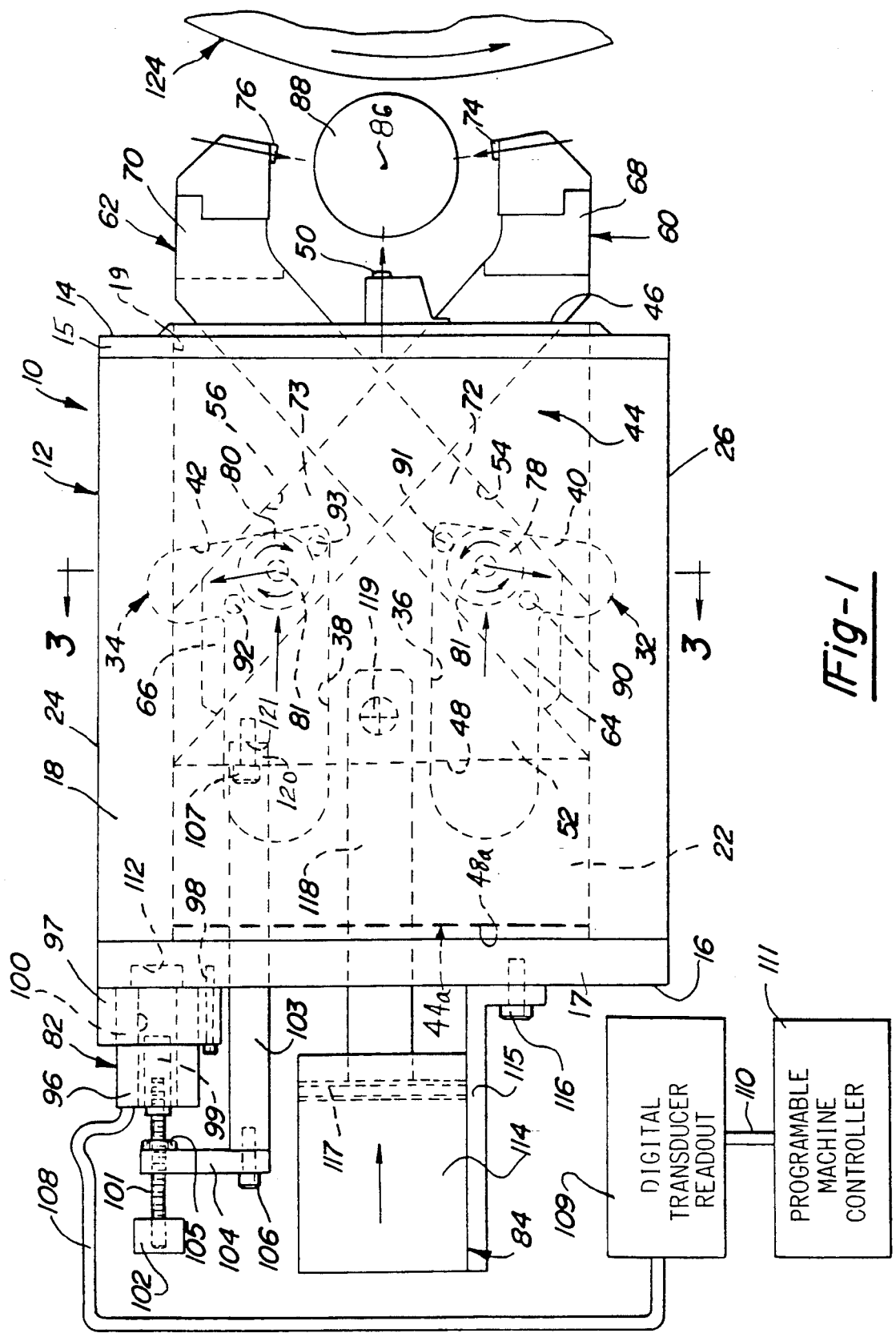
FIG. 1 is a front elevation view of a steady rest having an integral gaging device in accordance with a preferred embodiment of this invention, wherein the steady rest is in a partially extended position.
Figure 2:
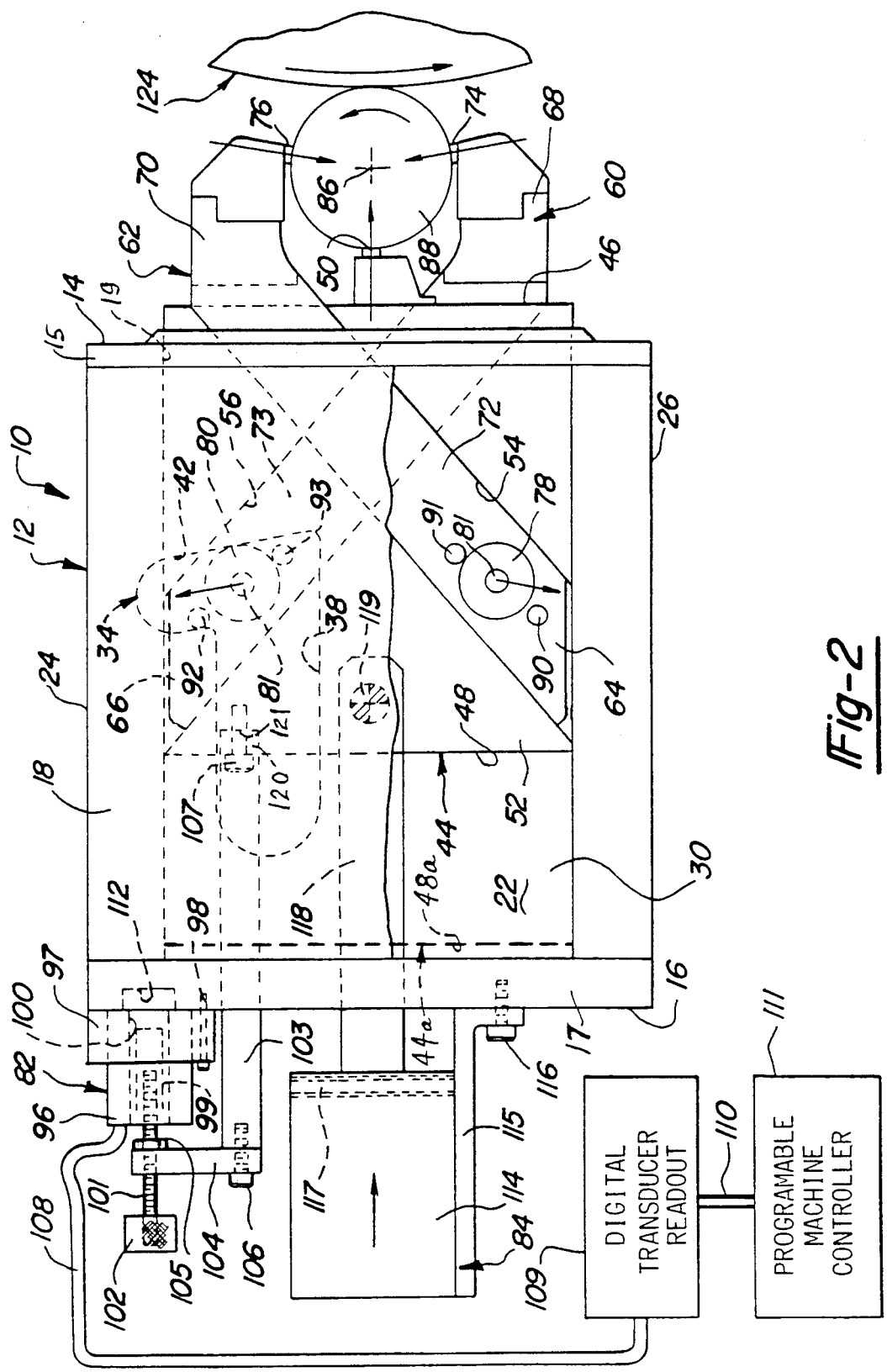
FIG. 2 is a front elevation view, with parts broken away and parts in partial cross section, of the steady rest of FIG. 1 wherein the steady rest is in an extended and gripping position.

FIG. 1 illustrates the automatic steady rest of the present invention, generally indicated by the numeral 10, as it appears in a partially extended position. For purposes of more clearly illustrating the present invention, FIG. 2 shows the automatic steady rest 10 in an extended workpiece engaging position, and it better shows some of the interior structure of the steady rest 10. The steady rest 10 has a housing, generally indicated by the numeral 12, and having a longitudinal axis and a transverse axis, with a working end 14 formed by a wiper member 15 at one end, and a remote end 16 formed by a rear end wall 17 at the other end of the longitudinal axis. As can be seen in the cross-sectional view in FIG. 3, the housing 12 also has a first side wall 18 and an opposing second side wall 20, both of which are parallel to the plane of the longitudinal and transverse axes. The first and the second side walls 18 and 20 together define a cavity 22 within the housing 12. A top wall 24 and a bottom wall 26, in conjunction with the first and second side walls 18 and 20, complete a contiguous four-sided enclosure for the housing 12.

In the corresponding first and second interior surfaces 28 and 30 of the first and second side walls 18 and 20, respectively, there are formed a first camming contour 32 and an oppositely disposed second camming contour 34. Referring again to FIGS. 1 and 2, each camming contour 32 and 34 has a longitudinal portion 36 and 38, respectively, and a transverse portion 40 and 42, respectively, which extends away from the longitudinal axis. In the preferred embodiment, both the first and second camming contours 32 and 34 are machined into, but not through, the interior facing surfaces 28 and 30 of the opposing side walls 18 and 20, respectively, for lubrication containment and for prevention of contamination. In addition, for manufacturing purposes it is desirable to make the first and second side walls 18 and 20 identical such that, as mounted to the housing 12, the first and second camming contours 32 and 34 are reverse images of each other on opposite sides of the longitudinal axis.

Disposed within the housing 12 is an operator body, generally indicated by the numeral 44, which is longitudinally slidable between and against the interior facing surfaces 28 and 30 on the first and second side walls 18 and 20, respectively. The operator body 44 is slidable from a retracted position adjacent the rear end wall 17 to an advanced or extended position through an opening 19 in the wiper number 15. The operator body 44 has a contact end 46 adjacent the working end 14 of the housing 12, and a gaging end 48 adjacent the remote end 16 of the housing 12. Centrally located on the contact end 46 of the operator body 44 is a center workpiece contact member 50.

As more clearly seen in FIGS. 4 and 5, which are front elevation and end views, respectively, of the operator body 44, on a first surface 52 of the operator body 44, adjacent to and facing the first camming contour 32 of the housing 12 (FIG. 3), there is a first groove 54, with a corresponding second groove 56 disposed on an opposing second surface 58 of the operator body 44, adjacent to and facing the second camming contour 34. Each of the grooves 54 and 56 extend obliquely across the corresponding surfaces 52 and 58, relative to the longitudinal axis, and in a crisscross manner relative to each other. In addition, each of the grooves 54 and 56 extend to an opposing edge of the operator body 44, adjacent either the top wall 24 or bottom wall 26 of the housing 12. Each of the grooves 54 and 56 then obliquely extend toward the contact end 46 of the operator body 44 in the aforementioned crisscross manner, projecting symmetrically on opposite sides of the center workpiece contact member 50.

Referring again to FIGS. 1, 2 and 3, slidably mounted within each of the grooves 54 and 56 is a first gripper arm, and a second gripper arm, generally indicated by the numerals 60 and 62, respectively, which together perform the task of gripping a cylindrical workpiece 88 (FIGS. 1 and 2) on either side of the center workpiece contact member 50. Each of the gripper arms 60 and 62 has a sliding end 64 and 66, and an oppositely disposed gripping end 68 and 70, respectively. Sliding portions 72 and 73 are located adjacent the sliding ends 64 and 66, of each gripper arm 60 and 62, respectively, and slidably engage their respective groove 54 and 56. Both gripping ends 68 and 70 extend from their respective grooves 54 and 56, on opposite sides of the center workpiece contact member 50, out beyond the working end 14 of the housing 12. Disposed at each gripping end 68 and 70 is a side workpiece contact member 74 and 76, respectively, which together form a three-point contact with the periphery of the workpiece 88.

For purposes of the present invention, it has been found that a low friction, very hard material is best suited for use as the center and side workpiece contact members 50, 74 and 76. The low friction characteristic of said material improves the sensitivity of the steady rest 10 in regard to the condition of the workpiece 88, while the hardness characteristic of said material makes for a more durable and reliable workpiece contact member. A particularly well suited material for the workpiece contact members, or wear pads 50, 74 and 76, for purposes of the present invention is a commercially available polycrystalline diamond material.

First and second roller devices 78 and 80, such as cam rollers, are rotatably attached to the respective first and second gripper arms 60 and 62, on their respective first and second sliding portions 72 and 73, by suitable dowel pins 81. The first and second roller devices 78 and 80 each engage its respective transverse portion of the camming contours 32 and 34, providing low friction camming between the first and second gripping arms 60 and 62 and the transverse portions of the first and second camming contours 32 and 34, respectively.

FIGS. 1 and 2 show cooperating with the first and second roller devices 78 and 80 a first and second pair of fixed guide pins 90, 91, and 92, 93. The fixed guide pins 90 and 92 slidably engage the outboard sides of the longitudinal camming contour portions 36 and 38. The fixed guide pins 91 and 93 only slidably engage the inboard sides of the longitudinal camming contour portions 36 and 38. The rolling action of the roller devices 78 and 80 is most crucial, necessitated by a need for maximum sensitivity of the operator body 44, during rolling on the transverse portions 40 and 42 in the extension stroke, when the side workpiece contact members 74 and 76 are converging with the center workpiece contact member 50 towards the workpiece 88, and additionally when the side workpiece contact members 74 and 76 and the center workpiece contact member 50 are following down the workpiece 88, as its diameter is reduced during a machining or grinding operation. In the preferred embodiment, it has been found that the gripper arms 60 and 62 will better clear the workpiece 88 during a retraction stroke if guided through the longitudinal portions of the camming contours 32 and 34 by the guide pins 90, 91, and 92, 93. Consequently, the roller devices 78 and 80 coact with the camming contours 32 and 34 when transversing the upper side of the transverse camming contour portions 40 and 42. The remainder of the extension and retraction strokes are guided by the fixed guide pins 90, 91, and 92, 93 sliding in the longitudinal camming contour portions 36 and 38 of the camming contours 32 and 34, respectively.

Mounted to the housing 12, adjacent the remote end 16 and interconnected with the gaging end 48 of the operator body 44, is an electronic measuring device, generally indicated by the numeral 82, for measuring the longitudinal displacement of the operator body 44 in relation to the housing 12. Various forms of precision displacement transducers are capable of working satisfactorily as the electronic measuring device 82, particularly those commonly referred to as a linear variable differential transducer (LVDT). An example of a commercially available LVDT is Model 300HR manufactured by Schaevitz Engineering of Pennsauken, N.J., U.S.A.

As shown in FIG. 1, the illustrated linear variable differential transducer 82 includes a coil 96 which is operatively mounted in a support block 97. The support block 97 is secured to the outer side of the housing remote end wall 17, by any suitable means, as by bolts 98. A core rod 99 is movably mounted within the axial cylindrical opening 100 formed through the coil 96. The core rod 99 is threadably secured to the inner end of an adjustment rod 101. The adjustment rod 101 has a knurled knob 102 fixed on the outer end thereof for turning the rod 101 for adjusting the position of the core rod 99 in the axial opening 100. The adjustment rod 101 is connected to the gaging end 48 of the operator body 44 by an elongated shaft 103 and an attachment bracket 104. One end of the attachment bracket 104 is threadably mounted on the adjustment rod 101 and secured in an adjusted position on the rod 101 by means of a lock nut 105. The other end of the attachment bracket 104 is secured to the rear end of the shaft 103 by a suitable bolt 106. The front end of the shaft 103 is T-shaped, with a pair of flanges 120 that are seated in a rectangular slot 121 formed in the gaging end 48 of the operator body 44. The flanges 120 are secured to the operator body 44 by a plurality of suitable bolts 107.

The coil 96 is electrically connected by suitable conductors 108 to a digital transducer readout apparatus 109 which in turn is connected by suitable wires 110 to a programmable machine controller 111. The numeral 112 indicates a pocket or recess in the housing remote end plate 16 into which the core rod 99 may extend in case of an overtravel movement of the core rod 99.

For purposes of displacing the operator body 44 longitudinally within the housing 12, there is provided a stroking device 84 mounted on the remote end wall 17 of the housing 12 and mechanically linked to the operator body 44. Where automation is desired, it is preferable that such a stroking device 84 be actuated by either electrical or fluid power. By example, compressed air will be readily available under most manufacturing conditions, and is suitable for the present invention. However, it has been found that hydraulic actuation of the stroking device 84 is generally preferred.

As shown in FIG. 1, the stroking device or power apparatus 84, for moving the operator body 44 through the extension and retraction movements, is illustrated as a hydraulic cylinder 114 which is operatively mounted on a suitable support bracket 115 that is secured to the housing remote end 17 wall by any suitable means, as by bolts 116. The hydraulic cylinder 114 includes the usual piston 117 which has connected thereto a piston rod 118. The outer end of the piston rod 118 is operatively secured to the gaging end 48 of the operator body 44 by any suitable means, as by a hinge pin 119.

In operation, the operator body 44 moves through an extension stroke, commencing with the gaging end 48 thereof in an initial or retracted position shown by the broken line position 48a in FIGS. 1 and 2. Each of the first and second rollers 78 and 80 move through their respective camming contour longitudinal portions 36, and 38 of the camming contours 32 and 34, in a non-engaging relationship, but with the guide pins 90, 91 and 92, 93 slidably engaging the longitudinal camming contour portions 36 and 38, to provide longitudinal extension of both the center workpiece contact member 50 and the first and second gripper arms 60 and 62 toward the workpiece 88. While the first and second rollers 78 and 80 are non-operative in the camming contour longitudinal portions 36 and 38 of the camming contours 32 and 34, their respective first and second gripping arm sliding portions 72 and 73 remain substantially stationary with respect to the operator body 44.

Once the first and second rollers 78 and 80 have moved through their respective camming contour longitudinal portions 36 and 38, the first and second rollers 78 and 80 roll on the upper end surface of their respective first and second camming contour transverse portions 40 and 42 for the remainder of the extension stroke, and the gripping arm first and second sliding portions 72 and 73 slide within their respective grooves 54 and 56 in a substantially lateral, outward direction, away from the longitudinal axis and each other. The divergence of the gripping arm sliding ends 64 and 66 correspond to a convergence of the gripping ends 68 and 70. At the same time, the operator body 44 continues to be displaced longitudinally, toward the workpiece 88, providing further longitudinal extension of the center workpiece contact member 50.

The combined motion, of the extension of the center workpiece contact member 50 with the convergence of the side workpiece contact members 74 and 76, provides for a three-point, true centering engagement with the workpiece 88. The first and second rollers 78 and 80, together with their respective fixed sets of pins 90, 91, and 92, 93, respectively, follow their respective first and second camming contours 32 and 34 in a sequentially reverse manner during the retraction stroke of the operator body 44.

In a preferred embodiment of this invention, the center workpiece contact member 50 and each of the first and second side workpiece contact members 74 and 76 converge at an equal rate toward a converging point 86 during, their movements through the transverse portions 40 and 42 of their respective camming contours 32 and 34, respectively. By design, the converging point 86 can be readily made to coincide with the central longitudinal axis of the workpiece 88 for achieving a three-point, true centering engagement with the workpiece 88.

Benefits from both the remote location of the electronic measuring device 82 and the efficient rolling action between the first and second rollers 78 and 80 and their respective transverse portions of the camming contours 32 and 34 can now be appreciated. As a desirable result of reduced frictional drag associated with the roller-guide pin-cam arrangement, the gripper arms 60 and 62 are able to closely follow the workpiece 88 during a machining operation, or a grinding operation by a grinding wheel 124 as illustrated in FIGS. 1 and 2. The rollers 78 and 80 provide smooth, low frictional operation between the gripper arms 60 and 62 and the transverse portions of the camming contours 32 and 34, which accordingly, allows the operator body 44 to closely follow with increased sensitivity the displacement of the center workpiece contact member 50, as the diameter of the workpiece 88 is reduced by a machining or grinding operation. The operation and efficiency of the steady rest 10 is consequently improved by the reduction of its internal friction.

As an additional benefit of the present invention's improved efficiency, the electronic measuring device 82 can read directly from the operator body 44 instead of being required to gage directly from the workpiece 88. The longitudinal displacement of the operator body 44 corresponds with precision to the longitudinal displacement of the center workpiece contact member 50, which in turn directly contacts the workpiece 88 on its perimeter. As a result, the electronic measuring device 82 can be located with the operator body 44 while being remote from the workpiece 88, and yet still retain the precision required for most operations.

In the use of the electronic measuring device 82, a finished diameter workpiece is set up in the machine which rotatably holds the workpiece 88. The stroking device 84 is then operated to bring the workpiece contact members 50, 74 and 76 into a three-point contact with the diameter of the finished workpiece. The lock nut 105 on the adjustment shaft 101 is then loosened and the shaft 101 is adjusted by means of the knurled knob 102 in order to move the core rod 99 in the coil 96 to a position so that the correct size information is sent through the wires 108 to the digital transducer readout, which in turn provides information to the machine programmable controller 111. After the aforedescribed steps are taken for setting up the electronic measuring device 82, the operator merely has to continue to load and unload workpieces 88, and programmable machine controller 111 stops the grinding or other machining operation when the correct size is achieved. The machine operator checks the size periodically but he does not have to check the size with every workpiece.

Another benefit of the invention is that the stroking of the operator body 44 can be computer controlled to coact with the output of the electronic measuring device 82, such as when an LVDT is used. With coaction between the electronic measuring device 82 and the stroking device 84, the extension stroke and retraction stroke can be accurately controlled and monitored for gaging the workpiece 88. In cooperation with the automatic true centering capability of the present invention, automatic manufacturing processes are then achievable with suitable precision.

While the invention has been described in terms of a preferred embodiment, it is apparent that other forms could be adopted by one skilled in the art. An example is to relocate the electronic measuring device 82 to a position other than the remote end 16 of the housing 12 while still keeping it coacting with the operator body 44 but remote from the workpiece 88. Accordingly, the scope of the invention is to be limited only by the following claims.

What is claimed is:

1. An automatic true centering steady rest apparatus, comprising:
   (a) a housing having a longitudinal axis and a transverse axis, said housing having a working end at one end of said longitudinal axis, said housing having camming surface means parallel to the plane of said longitudinal axis and said transverse axis;
   (b) an operator body disposed within said housing, said operator body being slidable longitudinally along said camming surface means of said housing, said operator body having a center workpiece contact member disposed adjacent said working end of said housing;
   (c) a pair of gripper arms operatively associated with said operator body, each of said pair of gripper arms having a sliding end and a gripping end, said gripping ends extending longitudinally from said working end of said housing, each of said pair of gripper arms having a sliding portion adjacent said sliding end, each of said sliding portions being slidable with said operator body, each of said pair of gripper arms having a side workpiece contact member disposed at said gripping end;
   (d) roller means rotatably attached to the sliding portion of each of said pair of gripper arms;
   (e) a set of guide pins attached to the sliding portion of each of said pair of gripper arms;
   (f) a pair of camming means formed in said camming surface means of said housing, each of said pair of camming means being disposed on opposite sides of the operator body and having a longitudinal portion and a narrower transverse portion;
   (g) each of said pair of camming means transverse portions camming with a respective one of said roller means to provide low friction camming between said pair of gripper arms and said pair of camming means transverse portions;
   (h) each of said pair of camming means longitudinal portions camming with a respective one of said guide pin sets; and,
   (i) stroking means for slidably displacing said operator body longitudinally along said camming surface means, said stroking means having an extension stroke and a retraction stroke, each of said sets of guide pins slidably engaging said longitudinal portion during said extension stroke to provide longitudinal extension of said center workpiece contact member and said gripper arms toward a workpiece, each of said roller means sequentially rollably engaging its respective transverse portion during said extension stroke to provide further longitudinal extension of of said center workpiece contact member while providing for convergence of said gripping ends of said gripper arms for engaging said workpiece with said side workpiece contact members, said center workpiece contact member and said side workpiece contact members providing three-point true centering engagement with said workpiece, each of said roller means and said sets of guide pins following a respective one of said transverse and longitudinal portions of said pair of camming means in a sequentially reverse manner during said retraction stroke.

2. A automatic true centering steady rest apparatus as claimed in claim 1, wherein:
   (a) said stroking means is actuated by electrical or fluid power.

3. An automatic true centering steady rest apparatus as claimed in claim 1, further comprising:
   (a) an electronic measuring means operatively associated with said operator body, said electronic measuring means operative to continuously gage the diameter of a workpiece by measuring the longitudinal displacement of said operator body in relation to said housing during a machining operation on the workpiece.

4. An automatic true centering steady rest apparatus as claimed in claim 3, wherein:
   (a) said stroking means coacts with said electronic measuring means to control said extension stroke and said retraction stroke for gaging a workpiece.

5. An automatic true centering steady rest apparatus as claimed in claim 3, wherein:
   (a) said electronic measuring means comprises a linear velocity displacement transducer operatively connected to said operator body;
   (b) a digital transducer readout apparatus electrically connected to said linear velocity displacement transducer; and,
   (c) a programmable machine controller electrically connected to said digital transducer readout apparatus.

6. An automatic centering steady rest apparatus as claimed in claim 1, wherein:
   (a) said further longitudinal extension of said center workpiece contact member, and said convergence of said gripping ends during said extension stroke occur equally toward a converging point; and,
   (b) said converging point coinciding with a central longitudinal axis of said workpiece for achieving said three-point true centering engagement between said side workpiece contact members and said center workpiece contact member with said workpiece.

7. An automatic true centering steady rest apparatus as claimed in claim 6, further comprising:
   (a) a pair of grooves disposed on opposing surfaces of said operator body;

(b) said pair of grooves extending obliquely relative to said longitudinal axis across said opposing surfaces in a crisscross manner relative to each other;

(c) said grooves projecting symmetrically on opposite sides of said center workpiece contact member on said operator body; and, (d) said sliding portions of said gripper arms slidably mounted within a respective one of said pair of grooves.

8. An automatic true centering steady rest apparatus as claimed in claim 7, wherein:

(a) said sliding portion of each of said pair of gripper arms remains substantially stationary with respect to said operator body while a set of guide pins is camming with said longitudinal portion of a respective one of said pair of camming means, and wherein said sliding portion slides within said respective one of said pair of grooves in a substantially lateral direction outward from said longitudinal axis while said respective one of said roller means is camming with said transverse portion of said respective one of said pair of camming means.

* * * * *